Jan. 6, 1925.

W. C. D. COCHRAN

IDENTIFICATION DEVICE

Filed Oct. 9, 1922

W.C.D. Cochran
INVENTOR

BY *Victor J. Evans*
ATTORNEY

WITNESS:

Jan. 6, 1925.

W. C. D. COCHRAN

IDENTIFICATION DEVICE

Filed Oct. 9, 1922

W.C.D. Cochran
INVENTOR

BY Victor J. Evans
ATTORNEY

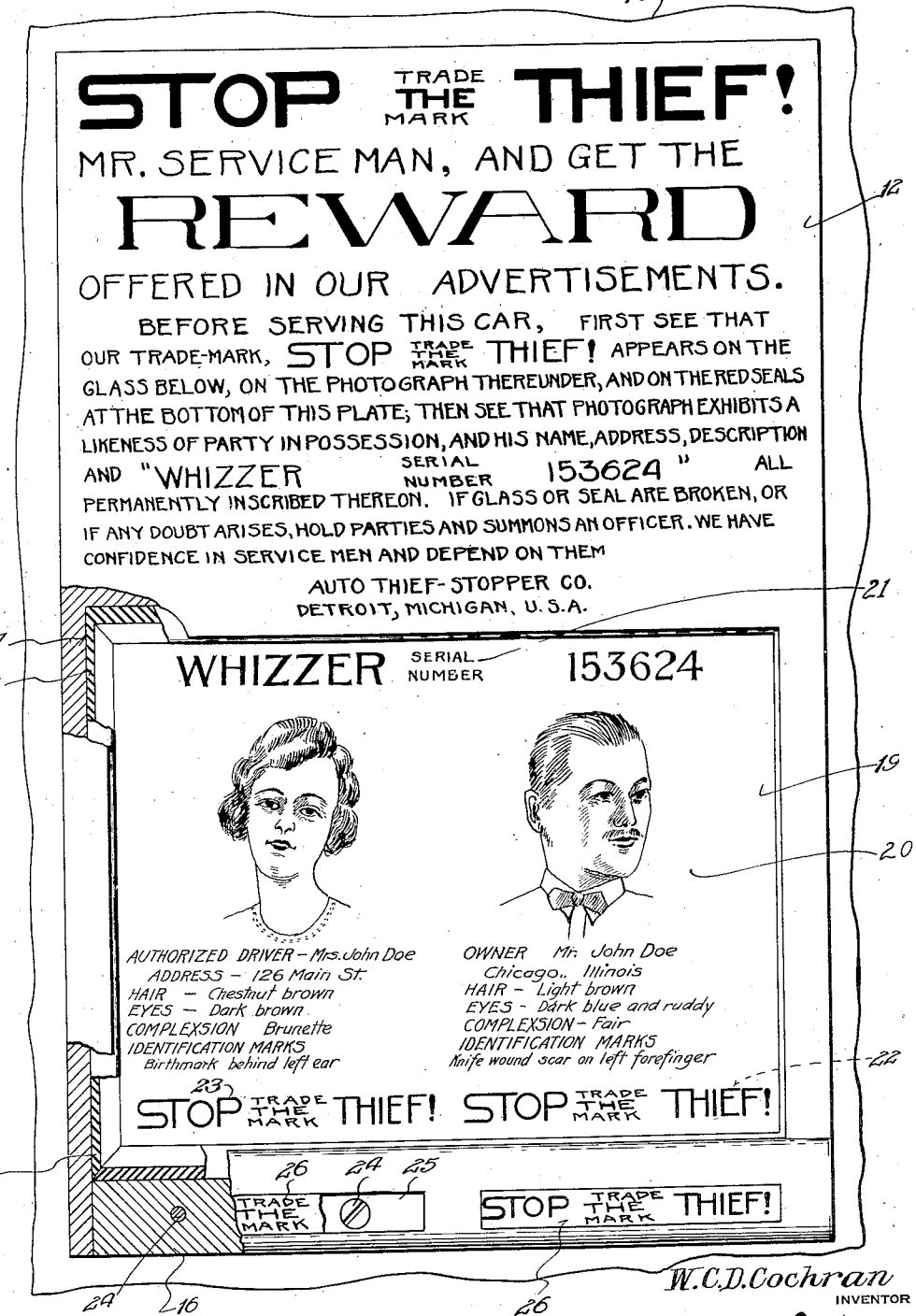

Patented Jan. 6, 1925.

1,522,418

UNITED STATES PATENT OFFICE.

WALLACE C. D. COCHRAN, OF SAFFORD, ARIZONA.

IDENTIFICATION DEVICE.

Application filed October 9, 1922. Serial No. 593,327.

*To all whom it may concern:*

Be it known that I, WALLACE C. D. COCHRAN, a citizen of the United States, residing at Safford, in the county of Graham and State of Arizona, have invented new and useful Improvements in Identification Devices, of which the following is a specification.

This invention relates to identification devices and has for an object the provision of means whereby the theft of vehicles, such as automobiles, or the unauthorized use thereof, will be prevented or reduced to a minimum.

Another object of the invention is the provision of a device of the above character which, in the event of the theft of a vehicle to which it is applied, will quickly lead to the apprehension or arrest of the thief.

With the above and other objects in view, the invention further includes the following novel features and details of construction, to be hereinafter more fully described, illustrated in the accompanying drawings and pointed out in the appended claims.

In the drawings:—

Figure 5 is an enlarged fragmentary elevation showing the identification plate and identification card, the plate being partly broken away.

Figure 1:
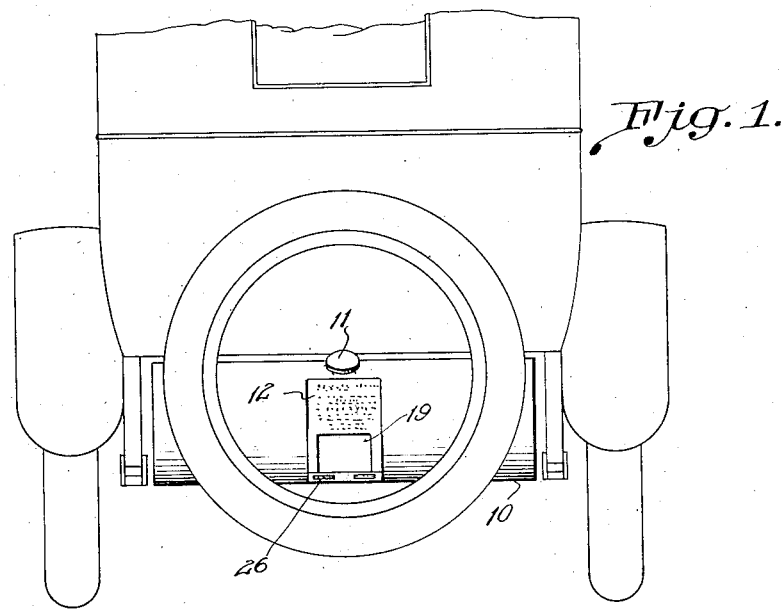
Figure 1 is an elevation of a portion of an automobile, showing the fuel tank of the latter with the invention applied thereto.
Figure 2:
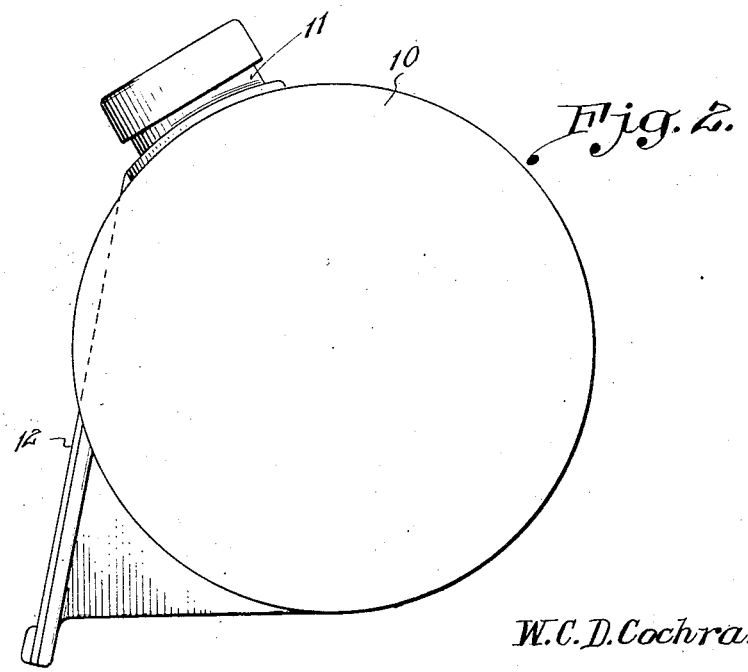
Figure 2 is a view at right angles to Figure 1 showing the tank in end elevation.
Figure 3:
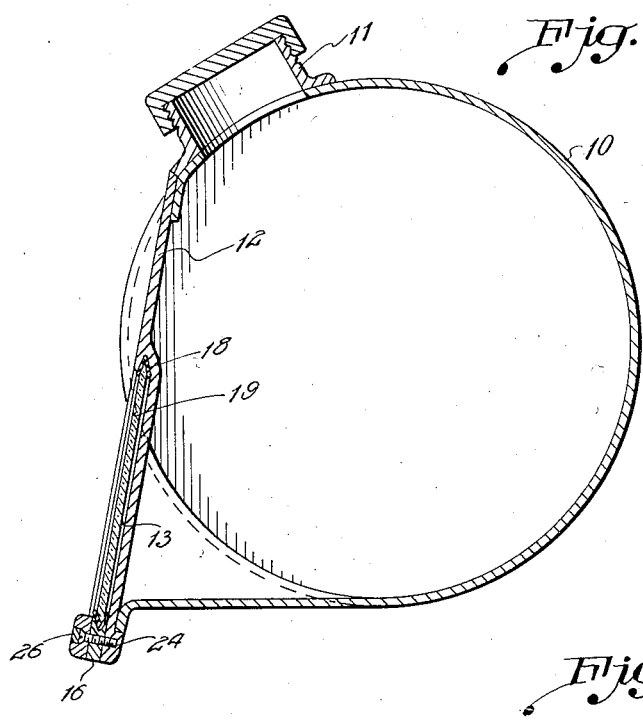
Figure 3 is a transverse sectional view of the tank.

Referring in detail to the drawings, wherein like characters of reference denote corresponding parts, the reference character 10 indicates the fuel tank of an automobile which may be either cross sectionally round, rectangular or other suitable shape and which is provided with the usual filler spout 11.

Figure 4:
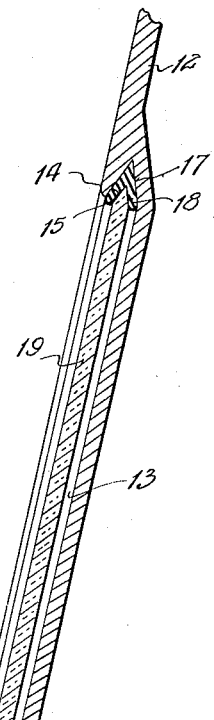
Figure 4 is an enlarged section through the pocket or compartment.

Located below or adjacent this spout 11 is a plate 12, which may be an integral part of, or may be permanently secured to the tank 10 so as to form a part of said tank. In the latter event, the lower edge of the plate 12 is secured to the lowest part of the tank, so that in the event of the forcible removal of the plate the entire contents of the tank will drain therefrom, so that the latter will become mutilated and useless. The plate 12 is provided in its outer surface with a compartment or pocket 13 which is surrounded on three sides with a flange or rib 14 whose inner face is beveled or inclined and co-operates with the beveled or inclined portion 15 of the pocket 13 to provide a substantially V-shaped groove. The open end of the pocket is adapted to be closed by a retaining or closure strip 16 whose inner edge is provided with a substantially V-shaped groove 17, which co-operates with the groove above mentioned so as to provide a continuous substantially V-shaped groove for the reception of a cross sectionally V-shaped gasket or cushioning strip 18, which provides a seat for the edges of a glass or other transparent plate 19, the latter forming the outer wall of the pocket 13 and being spaced from the inner wall of said pocket by the thickness of the gasket 18, as clearly shown in Figure 4 of the drawings. This pocket is adapted to contain a suitable identification card 20, which may contain the photograph of the owner of the vehicle and which may also contain photographs of the authorized drivers or users thereof (not including hired chauffeurs), together with their addresses and description, which latter may include remarks or characteristics peculiar to the persons described. In addition, the card 20 is adapted to contain the name and serial number of the vehicle to which said card is attached, as shown at 21 and a distinguishing mark or trade name, as indicated at 22, which mark or name may also appear upon the glass 19, as shown at 23, so as to render difficult the substitution of a counterfeit card. In order for a thief to substitute such counterfeit identification card without leaving evidence of his work, he must accomplish three things, any one of which is impossible without special factory equipment and materials. He must first reproduce the identification card itself with its mark or trade name, distinctive style of inscription and so forth; second he must reproduce the seals (hereinafter referred to) with their distinctive mark or trade name; and third, he must reproduce the distinctively marked glass due to the fact that it is impossible to force the rightly fitting retaining or closure strip out of the opening in the bottom of the plate without first breaking and removing the glass. This is due to the fact that, with the glass in place and the bottom of the strip flush with the bottom edge of the plate, there is no exposed part of the closure strip to which outwardly driving or pulling force can be applied and the strip is too thin and fits too tightly to allow of its being tapped and extracted with a threaded puller. Of course, the identification card may be removed after merely breaking and removing the glass, but before a new glass can be inserted, the seals must be broken and the closure strip removed; hence in order to effect the substitution of a counterfeit card as before stated, it is necessary to destroy both the seals and the glass and for this reason the name or mark is also applied to the glass.

In addition, the top, upper portion of the plate 12 is provided with suitable indicia, that shown including the trade name arranged in the same manner shown upon the glass at 23, the indicia being preferably arranged as follows:

Stop the Thief!
trade
mark

Mr. Service Man, and get the Reward Offered in our Advertisements.

Before servicing this car, first see that our trade-mark, Stop the Thief! appears on the glass below, on the photograph thereunder, and on the red seals at the bottom of this plate; then see that photograph exhibits a likeness of party in possession, and his name, address, description and "Whizzer Serial Number 153624" all permanently inscribed thereon. If glass or seals are broken, or if any doubt arises, hold parties and summon an officer. We have confidence in service men and depend on them.

Auto Thief Stopper Company,
Detroit, Michigan, U. S. A.

The retaining strip or closure 16 is secured within the open end of the pocket 13 by means of screws or similar fastening devices 24 and the outer lower portion of the plate 12 is provided with countersunk portions or sockets 25, within which are permanently secured seals 26 which may be of a distinguishing character and may contain the trade name or other indicia above specified.

The identification matter is thus permanently secured to the fuel tank or other part of the automobile and service men or others noticing the card, may readily determine whether or not the occupants are those represented by the photographs upon the identification card 20 and it will be impossible to remove said card without mutilating the seals 26, or without removing or rendering the tank 10 unfit for use.

Figure 6:
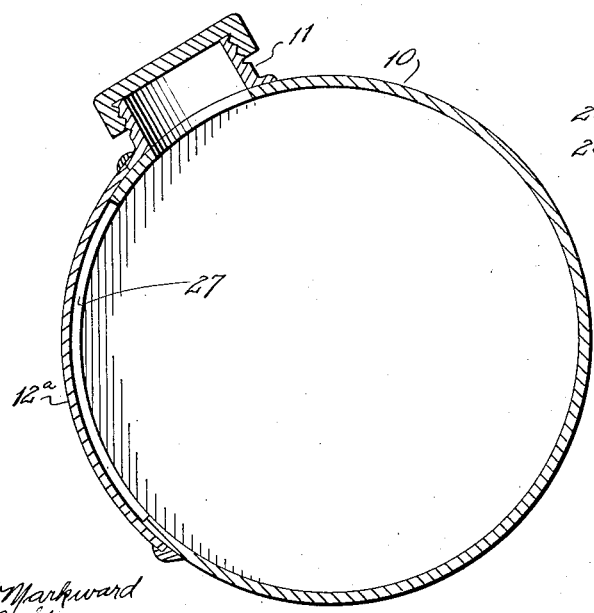
Figure 6 is a fragmentary section showing a modified form of the invention.

In Figure 6 of the drawings there is illustrated a modified form of the invention in which the plate 12ª containing indicia above set forth and the identification card previously described, is soldered, welded or otherwise permanently secured over an opening 27 provided in the fuel supply tank 10 and in this manner forms a permanent part of the tank.

The invention is susceptible of various other changes in its form, proportions and minor details of construction and the right is herein reserved to make such changes as properly fall within the scope of the appended claims.

Having described the invention what is claimed is:—

1. The combination with the fuel supply tank of a motor vehicle, of a pocket formed in the wall of the tank, an identification card within said pocket, means for closing the pocket to hold the card in place and means including a seal to prevent the removal of the pocket closing means.

2. The combination with the fuel supply tank of a motor vehicle, of an identification device including a plate forming a permanent part of said vehicle structure, a pocket formed in the plate, an identification card within the pocket and means for permanently closing the pocket.

3. The combination with the fuel supply tank of a motor vehicle, of an identification device including a plate forming a permanent part of said vehicle, a pocket formed in the plate, an identification card within the pocket, a closure for the pocket, a fastening device inserted through the closure for holding the latter in place and a filler seal permanently secured within a socket over the fastening device.

4. The combination with the fuel supply tank of a motor vehicle, of an identification device including a plate forming a permanent part of said vehicle structure, a pocket formed in said plate, a transparent outer wall for said pocket, an identification card within the pocket and combined means for permanently closing the pocket and securing the transparent wall in place.

5. The combination with the fuel supply tank of a motor vehicle, of an identification device including a plate forming a permanent part of said tank, means whereby the removal of said device will render the vehicle inoperative by rendering the fuel supply tank useless as such, a pocket formed in the plate, a transparent outer wall for said pocket, an identification card within the pocket, combined means for permanently closing said pocket and securing the transparent outer wall thereof in place and means for preventing the removal of said pocket closing means without first mutilating and removing said transparent wall.

6. The combination with the fuel supply tank of a motor vehicle, of an identification device including a plate forming a permanent part of said tank, means whereby the removal of said device will render the vehicle inoperative by rendering the said fuel supply tank useless as such, a pocket formed in said plate, a distinctive permanently marked transparent outer wall for said pocket, a distinctive permanently marked and inscribed identification card within the pocket, combined means for permanently closing said pocket and securing the transparent outer wall thereof in place, means including distinctive permanently marked seals for preventing the removal of said pocket closing means without first mutilating and removing both said seals and said transparent outer wall.

In testimony whereof I affix my signature.

WALLACE C. D. COCHRAN.